United States Patent
Baehrle-Miller et al.

(10) Patent No.: US 10,435,006 B2
(45) Date of Patent: Oct. 8, 2019

(54) METHOD FOR CHECKING THE BRAKING FORCE IN A VEHICLE

(71) Applicant: Robert Bosch GmbH, Stuttgart (DE)

(72) Inventors: Frank Baehrle-Miller, Schoenaich (DE); Dieter Blattert, Kirchheim-Neckar (DE)

(73) Assignee: Robert Bosch GmbH, Stuttgart (DE)

(*) Notice: Subject to any disclaimer, the term of this patent is extended or adjusted under 35 U.S.C. 154(b) by 281 days.

(21) Appl. No.: 15/189,740

(22) Filed: Jun. 22, 2016

(65) Prior Publication Data

US 2016/0375887 A1 Dec. 29, 2016

(30) Foreign Application Priority Data

Jun. 22, 2015 (DE) .................. 10 2015 211 461

(51) Int. Cl.
| | |
|---|---|
| *B60T 13/74* | (2006.01) |
| *B60T 17/22* | (2006.01) |
| *B60T 7/12* | (2006.01) |
| *B60T 13/58* | (2006.01) |
| *B60T 8/88* | (2006.01) |

(52) U.S. Cl.
CPC .............. *B60T 17/221* (2013.01); *B60T 7/12* (2013.01); *B60T 8/885* (2013.01); *B60T 13/586* (2013.01); *B60T 13/741* (2013.01); *B60T 2220/04* (2013.01); *B60T 2270/413* (2013.01)

(58) Field of Classification Search
CPC .... B60T 13/662; B60T 13/745; B60T 13/741; B60T 17/22; B60T 17/221; B60T 8/171; B60T 8/172; B60T 8/88; B60T 8/885; B60T 2270/419
See application file for complete search history.

(56) References Cited

U.S. PATENT DOCUMENTS

| | | | |
|---|---|---|---|
| 2005/0225167 A1* | 10/2005 | Kunz | B60T 8/4081 303/115.1 |
| 2008/0251328 A1* | 10/2008 | Albrich Von Albrichsfeld | B60T 8/3275 188/159 |
| 2013/0338895 A1* | 12/2013 | Bieltz | B60T 7/042 701/70 |
| 2016/0046274 A1* | 2/2016 | Matsuura | B60T 17/22 701/34.4 |
| 2016/0297413 A1* | 10/2016 | Alford | B60T 8/4081 |

FOREIGN PATENT DOCUMENTS

DE 10 2004 004 992 A1 9/2005

\* cited by examiner

*Primary Examiner* — Bradley T King
*Assistant Examiner* — Stephen M Bowes
(74) *Attorney, Agent, or Firm* — Maginot, Moore & Beck LLP

(57) ABSTRACT

A method for checking the braking force in a vehicle includes adjusting a brake piston with a vehicle hydraulic brake that has a braking force booster and with an electromechanical braking device that has a brake motor so as to generate a braking force. The hydraulic braking medium volume that corresponds to the displacement of the brake piston via the brake motor is compared to a hydraulic reference volume.

16 Claims, 4 Drawing Sheets

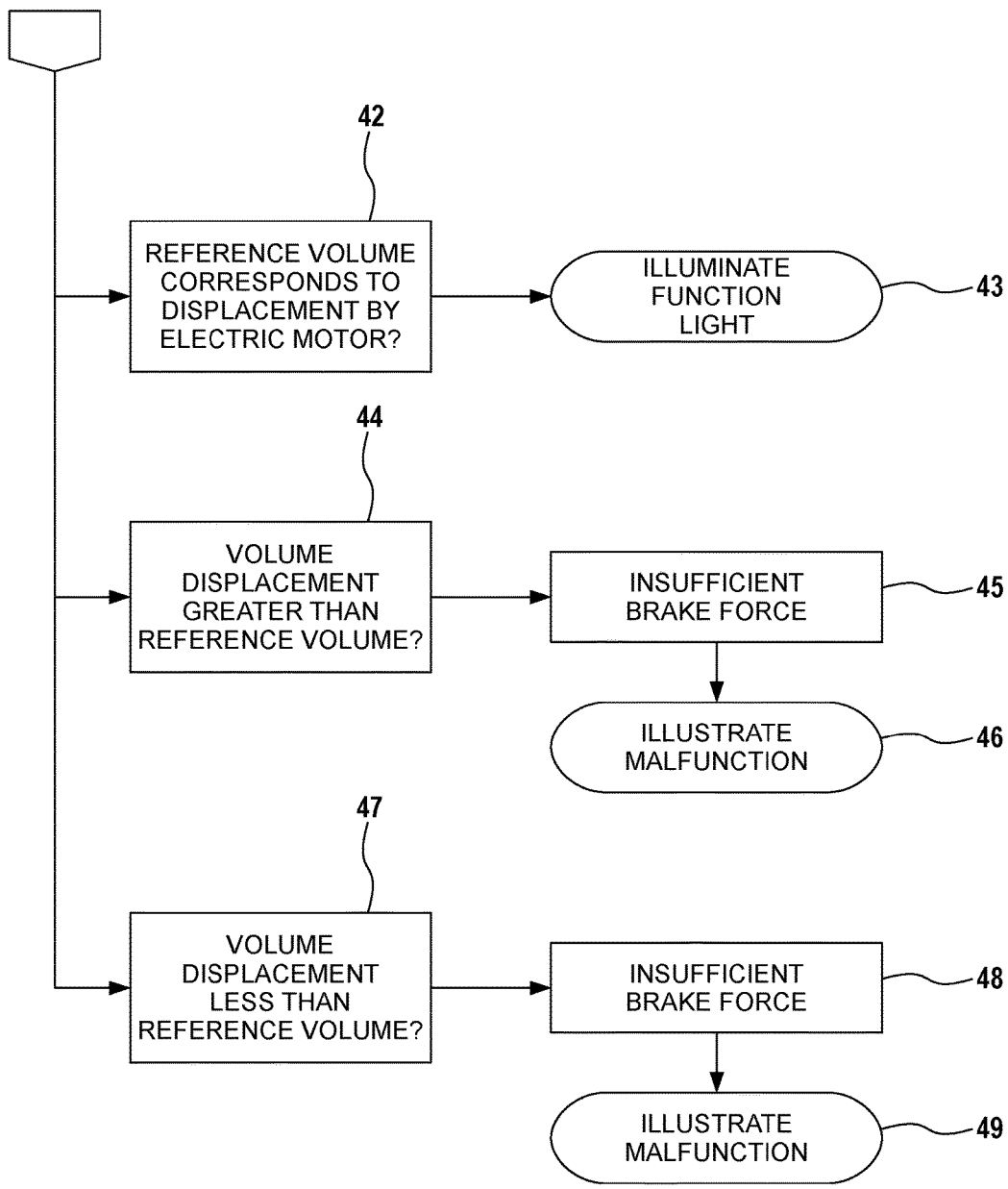

METHOD FOR CHECKING THE BRAKING FORCE IN A VEHICLE

This application claims priority under 35 U.S.C. § 119 to patent application no. DE 10 2015 211 461.9, filed on Jun. 22, 2015 in Germany, the disclosure of which is incorporated herein by reference in its entirety.

BACKGROUND

The disclosure relates to a method for checking the braking force in a vehicle in which both a vehicle hydraulic brake having a braking force booster as well as an electromechanical braking device having an electric brake motor adjust a brake piston so as to generate a braking force.

DE 10 2004 004 992 A1 discloses actuating a parking brake system that comprises an electric brake motor so as to generate a brake application force that secures the vehicle at a standstill. The parking brake system having the electric brake motor is integrated into the hydraulic wheel brake, wherein the brake motor adjusts a brake piston in the direction of a brake disc and the brake piston is also influenced by the vehicle hydraulic brake.

When parking the vehicle, the parking brake system having the electric brake motor is actuated in accordance with DE 10 2004 004 992 A1 so as to generate the brake application force. If it is established that the brake application force of the parking brake system has not achieved a required level of brake application force, the vehicle hydraulic brake is additionally actuated and an additional braking force is generated by way of said vehicle hydraulic brake.

SUMMARY

The method in accordance with the disclosure relates to checking the braking force in a vehicle in which both a vehicle hydraulic brake having a braking force booster as well as an electromechanical braking device having an electric brake motor act upon a brake piston of a wheel braking device in order to generate a desired braking force. During a general driving operation, the desired braking force is typically generated solely by way of the vehicle hydraulic brake whose hydraulic pressure acts upon the brake piston. When parking the vehicle, the electromechanical braking device having the electric brake motor is actuated and said brake motor generates a braking force or brake application force in an electromechanical manner by means of adjusting the brake piston.

The method in accordance with the disclosure relates to situations in which the two brake types, in other words both the vehicle hydraulic brake having the braking force booster as well as the electromechanical braking device having the electric brake motor, are actuated in order to generate a brake application force. It is possible by means of the combined effect of the two brake types on the common brake piston that although the braking force that is provided in an electromechanical manner by the brake motor corresponds to a desired level, the sum of the braking force of the vehicle hydraulic brake and the braking force of the electromechanical braking device does in fact lie below the required braking level. With the aid of the method in accordance with the disclosure, it is possible to identify cases of this type, as a result of which an error signal is generated that can be further processed in a suitable manner by way of example displayed to the driver and/or can be used to provide an additional braking force.

In order to check the braking force that is a combination of a portion from the vehicle hydraulic brake and a portion from the electromechanical braking device, the hydraulic braking medium volume that corresponds to the displacement of the brake piston by means of the electric brake motor is compared to a hydraulic reference volume. This hydraulic reference volume is determined from a known pressure-volume correlation taking as a basis the prevailing hydraulic pressure of the vehicle hydraulic brake. If the hydraulic braking medium volume that corresponds to the displacement of the brake piston by means of the electric brake motor deviates in an impermissibly high manner from the reference volume, this leads to the generation of an error signal.

If by way of example the vehicle is to be secured at a standstill and a corresponding braking force is to be generated, the vehicle hydraulic brake having the braking force booster and also the electromechanical braking device having the electric brake motor are activated. A specific hydraulic pressure is generated in the vehicle hydraulic brake by way of the braking force booster, said hydraulic pressure acting upon the brake piston. The brake motor of the electric braking device additionally influences the brake piston and adjusts said brake piston mechanically in the direction of the brake disc, wherein a change in volume in the hydraulic braking system accompanies the adjusting movement of the brake piston and this change of volume must be compensated for by means of an inflow of brake fluid. In order to avoid a drop in hydraulic pressure, it is possible to maintain the pressure as constant by way of an additional delivery by means of the braking force booster. However, it is also possible to take into account in the reference volume a drop in hydraulic pressure produced by means of a change in volume when actuating the electric brake motor.

Typically, the build-up of braking force by way of the vehicle hydraulic brake occurs more rapidly than the build-up of braking force by way of the electromechanical braking device since it is necessary for the electric brake motor to initially overcome a take-up distance until braking force is generated by said electromechanical braking device. When the electric brake motor is running and the take-up distance is being overcome, hydraulic braking force is already available, wherein the hydraulic braking medium pressure is advantageously maintained as constant. With the build-up of braking force by the electric brake motor, the brake piston displaces, wherein the volume that corresponds to the displacement of the brake piston is compensated for by means of activating the braking force booster.

In order to be able to identify deviations from a desired level of braking force that is a combination of the sum of the braking force from the vehicle hydraulic brakes and electromechanical braking device, the hydraulic braking medium volume that corresponds to the displacement of the brake piston by means of the electric brake motor is compared to the hydraulic reference volume. The hydraulic braking medium volume is determined by way of example by way of the distance that is covered by the brake piston as a result of the electric brake motor being actuated. For this purpose, for example the distance that is covered by the brake piston or a variable that is associated with said distance, for example an adjusting member such as by way of example a starting rod of the braking force booster is determined after applying the hydraulic pressure by means of the vehicle hydraulic brake and subsequently the position is once again determined after applying the brake application force by means of actuating the electromechanical braking device. It is possible to calculate from the difference the distance that is covered by the brake piston so that, taking into account the brake piston diameter, the hydraulic braking medium volume is known and said hydraulic braking medium volume corresponds to the displacement of the brake piston, said displacement being caused by the electric brake motor.

The comparison is made with the hydraulic reference volume that results from a pressure-volume curve taking as a basis the prevailing hydraulic pressure in the vehicle hydraulic brake. The hydraulic pressure is known, said pressure by way of example being determined by way of a pressure sensor in the vehicle hydraulic brake. A specific volume that illustrates the reference volume corresponds to this pressure.

Using the method, a braking force that is below the desired level is detected, as a result of which corresponding measures can be engaged. On the one hand, the error signal that is generated can be displayed to the driver in an optical, acoustic or other manner. On the other hand, the error signal can be further processed, in particular by way of repeating the procedure of controlling the braking force booster of the vehicle hydraulic brake and/or the electric brake motor of the electromechanical braking device in order to increase the total braking force to the required desired level.

The method is advantageously implemented when the vehicle is at a standstill. The method consequently follows a parking procedure of the vehicle and in particular is performed directly after bringing the vehicle to a standstill in order to be able to establish a level of braking force that is too low immediately after bringing the vehicle to a standstill and where appropriate to be able to engage corrective measures.

However, it is also possible to implement the method when the vehicle is moving. A prerequisite in this case is that both the vehicle hydraulic brake as well as the electromechanical braking device are actuated. It can also be advantageous to implement the method if the vehicle velocity is below a threshold velocity so that by way of example at proportionally low threshold velocities, the method is typically implemented during a parking procedure that is being performed. In accordance with a further embodiment variant, the method is implemented at all vehicle velocities.

The braking force booster comprises in accordance with a further expedient embodiment an electric motor for boosting a braking force, said electric motor being actuated so as to generate a hydraulic braking force (iBooster). The braking force booster is typically not a hydraulic pump of an electric stability program (ESP) that where appropriate in addition is integrated into the vehicle hydraulic brake. The braking force booster is advantageously located directly on the master brake cylinder of the vehicle hydraulic brake and can be controlled by way of an allocated controlling device. In accordance with an alternative embodiment, the braking force booster is the hydraulic pump of the electronic stability program.

The deviation between the hydraulic braking medium volume that corresponds to the displacement of the brake piston and the reference volume can relate both to a greater as well as a smaller hydraulic braking medium volume. It is possible in the two cases to conclude that the braking force in the brake is insufficient. If the hydraulic braking medium volume is greater than the reference volume, by way of example air is located in the hydraulic braking system. In contrast, if the hydraulic braking medium volume is smaller than the reference volume, there is an increased probability for the braking piston to be insufficiently adjusted by way of the electromechanical braking device and associated therewith for a braking force to be too low, said braking force being generated by the electric brake motor.

Crushed brake lines, such as for example can occur as a result of leaving the vehicle on a particularly high curb, are a further cause of the hydraulic braking medium volume being smaller than the reference volume. In this case, the free volume flow is greatly reduced and the pressure of the brake force booster only arrives in the brake jaw at a greatly reduced level. This likewise results in a brake application force that is too low.

During the braking procedure, in accordance with a further expedient embodiment, a braking force is simultaneously generated in both the vehicle hydraulic brake as well as in the electromechanical braking device. The activation of the vehicle hydraulic brake and the electromechanical braking device can be performed simultaneously or offset with respect to time. In the case of an activation that is offset, both initially an activation of the vehicle hydraulic brake and a subsequent activation of the electromechanical braking device as well as a control procedure in the reverse sequence are taken into account.

The individual method steps are executed in a regulating or control device in which adjusting signals are generated for controlling the various components of the braking system having the vehicle hydraulic brake including the braking force booster and the electromechanical braking device having the electric brake motor. The braking system comprises both the vehicle hydraulic brake as well as the electromechanical braking device.

BRIEF DESCRIPTION OF THE DRAWINGS

Further advantages and expedient embodiments are evident in the further claims, the description of the figures and the drawings. In the drawings:

FIGS. 3A and 3B illustrate a flow diagram for generating a braking force that secures the vehicle at a standstill, and for checking the braking force.

DETAILED DESCRIPTION

Figure 1:
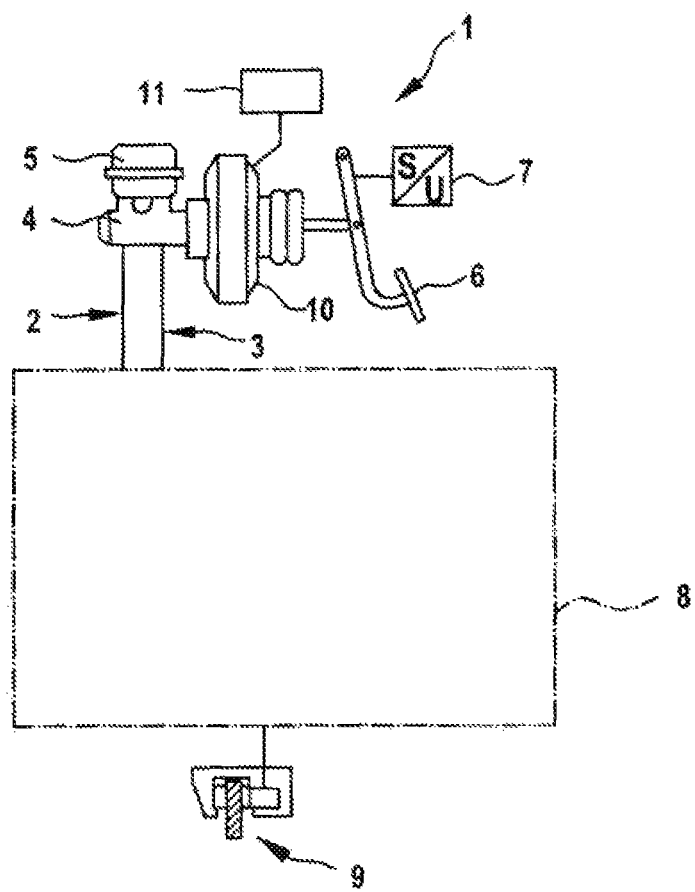
FIG. 1 illustrates schematically a braking system in a vehicle having a vehicle hydraulic brake that comprises a braking force booster, wherein an electric brake motor is additionally arranged on the wheel braking device.

Identical components are provided with identical reference numerals.

The braking system 1 that is illustrated in FIG. 1 for a vehicle comprises a vehicle hydraulic brake having a front axle brake circuit 2 and a rear axle brake circuit 3 for supplying and controlling wheel braking devices 9 at each wheel of the vehicle with a brake fluid that is under hydraulic pressure. The two brake circuits 2, 3 are connected to a common master brake cylinder 4 that is supplied by way of a brake fluid storage container 5 with brake fluid. The master brake cylinder 4 is actuated by the driver by way of the brake pedal 6, and the pedal travel that is exerted by the driver is measured by way of a pedal travel sensor 7. A braking force booster 10 is located between the brake pedal 6 and the master brake cylinder 4, said braking force booster comprising an electric motor that preferably actuates the master cylinder 4 by way of a gearing (iBooster). The value of the adjusting movement of the brake pedal 6 that is measured by the pedal travel sensor 7 is transmitted as a sensor signal to a regulating or controlling device 11 and adjusting signals for controlling the braking force booster 10 are generated in said regulating or controlling device. The wheel braking devices 9 are supplied with brake fluid in each brake circuit 2, 3 by way of various switching valves that together with other units are part of a hydraulic braking system 8 that includes other units. Furthermore, a hydraulic pump that is a component of an electronic stability program (ESP) is part of the hydraulic braking system 8.

Figure 2:
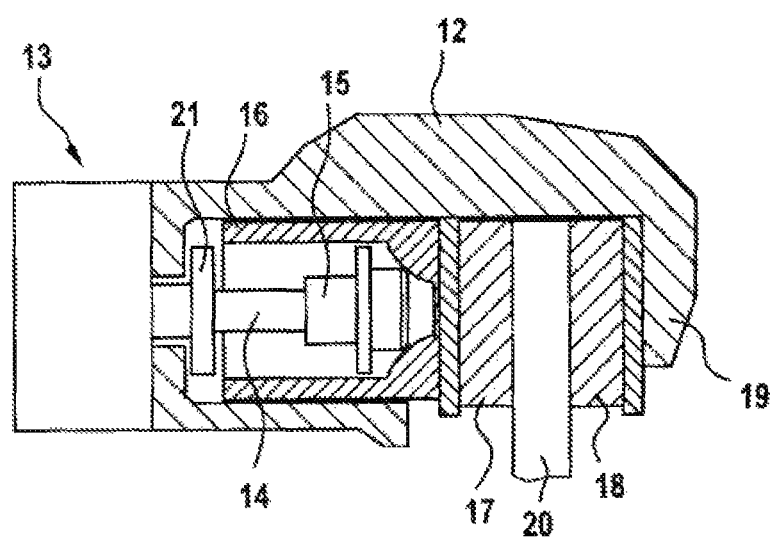
FIG. 2 illustrates a sectional view of an electromechanical braking device having an electric brake motor.

FIG. 2 illustrates an electromechanical braking device that is preferably used to secure a vehicle at a standstill; however, said device can be used even in the case of a moving vehicle, in particular at low vehicle velocities below a velocity threshold value. The electromechanical braking device comprises a brake caliper 12 having a jaw 19 that grips over a brake disc 20. The braking device comprises a direct current electric motor as a brake motor 13 as an adjustment member and the rotor shaft of said electric motor drives a spindle 14 in a rotating manner and a spindle nut 15 is rotatably mounted on said spindle. In the case of a rotation of the spindle 14, the spindle nut 15 is adjusted in an axial manner. The spindle nut 15 moves within a brake piston 16 that is the carrier of a brake pad 17 and said brake pad is pushed by the brake piston 16 against the brake disc 20. A further brake pad 18 is located on the opposite-lying side of the brake disc 20, said brake pad being held on the jaw 19 in such a manner that said brake pad cannot move.

The spindle nut 15 can move within the brake piston 16 axially forwards in the direction of the brake disc 20 in the case of a rotational movement of the spindle 14 or in the case of a rotational movement of the spindle 14 in the opposite direction said spindle nut can move axially to the rear until reaching a stop 21. The spindle nut 15 influences the inner end face of the brake piston 16 so as to generate a brake application force, as a result of which the brake piston 16 that is mounted in the braking device in an axially displaceable manner is pushed with the brake pad 17 against the end surface of the brake disc 20, said end facing the brake piston.

The electromechanical braking device is integrated into the wheel braking device 9 (FIG. 1) of the vehicle hydraulic brake in which the hydraulic pressure of the vehicle hydraulic brake acts upon the brake piston 16 and the vehicle is braked when travelling by means of said vehicle brake. The hydraulic pressure can also be effective in a supporting manner when the vehicle is at a standstill in the case of the electromechanical braking device being activated so that the total braking force is a combination of the electro-motorized portion and the hydraulic portion. Likewise, when the vehicle is travelling both the vehicle hydraulic brake as well as the electromechanical braking device can be actuated and in each case generate a braking force.

Figure 3A:
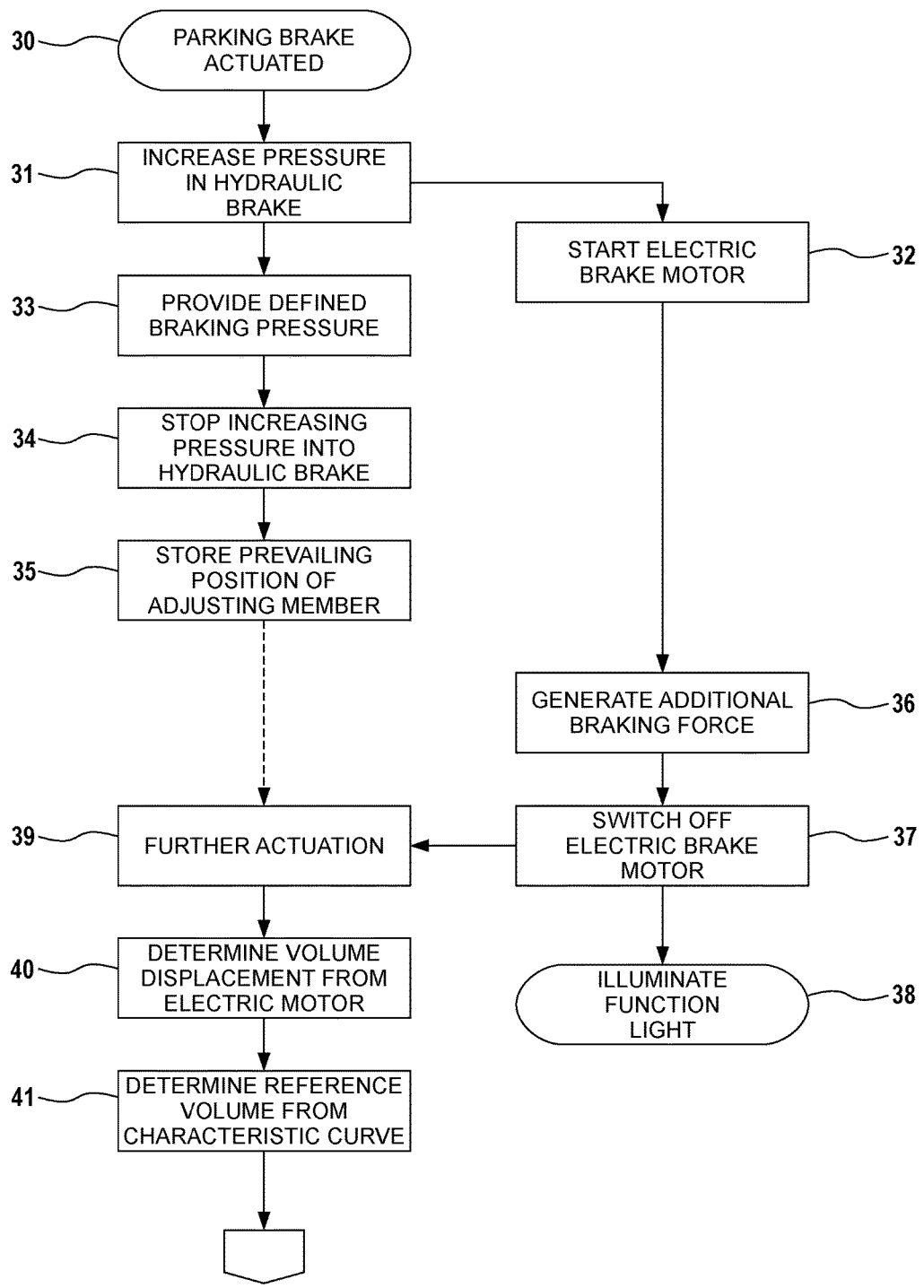

FIG. 3A and the continuation in FIG. 3B illustrate a flow chart for implementing a braking procedure and for checking the braking force in a vehicle. The method relates to providing a braking force for securing a vehicle that is at a standstill at the end of a parking procedure.

The method is started in method step 30 in which the driver declares a desire for a parking brake by way of a corresponding actuation. A braking force is subsequently provided in the vehicle both by way of actuating the vehicle hydraulic brake as well as by way of actuating the electromechanical braking device having the electric brake motor. In the next method step 31, the procedure of providing the pressure in the vehicle hydraulic brake is started in order to increase the hydraulic pressure and to generate a braking force in a hydraulic manner.

Parallel to this, the electric brake motor of the electromechanical braking device is controlled so that the rotor of the brake motor is started and during the rotational movement of said rotor starting from a starting position, initially it is necessary to overcome a take-up distance prior to the brake piston being influenced by the electric brake motor against the brake disc. The start of the electric brake motor occurs in the method step 32 near to the time of providing the pressure in the vehicle hydraulic brake in accordance with method step 31. The two procedures in the steps 31 and 32 can be performed precisely simultaneously or at a small time interval directly one after the other in that either initially the pressure is provided in accordance with step 31 and subsequently the electric brake motor is started in accordance with step 32 or the respective braking devices can be controlled in a reversed sequence.

The braking force is generated more rapidly by way of the vehicle hydraulic brake than generating the braking force by way of the electric brake motor. Consequently, it is possible for a braking force to already be made available by way of the vehicle hydraulic brake while the electric brake motor is still overcoming the take-up distance for influencing the brake piston.

In step 33, a defined braking pressure is provided at all four wheel braking devices of the vehicle wheels, by way of example a hydraulic pressure of 40 bar with which the brake piston is pressed against the brake disc. After this pressure is set, in step 34 the further increase in pressure is stopped and the hydraulic pressure is maintained. The pressure is provided by means of controlling the braking force booster 10 (FIG. 1). In step 35, the prevailing position of an adjusting member of the braking force booster is stored after achieving the hydraulic pressure that is set. By way of example if the braking force booster comprises an electro-motorized drive, the prevailing position of a starting rod of the braking force booster can be stored, said position being adjusted by the electro-motorized drive.

Parallel to this, the electric brake motor that is controlled in step 32 overcomes the take-up distance and finally in step 36 generates an additional braking force using electromechanical means in that the electric brake motor presses the brake piston against the brake disc. The braking force that is provided in an electromechanical manner is added to the braking force that is generated in a hydraulic manner. After the desired braking force of the electromechanical braking device has been achieved, the electric brake motor is switched off in step 37. In step 38, it is possible to illuminate a function light so as to inform the driver, said function light displaying to the driver the end of the actuation of the electric brake motor.

While the position of the brake piston is adjusted by way of the electric brake motor, parallel to this the hydraulic pressure in the vehicle hydraulic brake is still maintained constantly at a set pressure level in that hydraulic fluid is delivered by way of an actuation of the braking force booster in order to deliver the hydraulic braking medium volume that corresponds to the displacement of the brake piston by means of the electric brake motor. The distance that is covered by an adjusting member that is actuated by the braking force booster is determined and stored. In the next step 40, it is possible to determine the hydraulic braking medium volume that is delivered from the difference travel between the position of the adjusting member that has been achieved in step 35 after achieving the hydraulic pressure that is to be set and prior to influencing the brake piston by means of the electric brake motor, and the position of the adjusting member after a further actuation in step 39 and also taking into account the diameter of the brake piston. In step 41, this hydraulic braking medium volume that is delivered is determined using a reference volume that is determined from a pressure-volume characteristic curve on the basis of the prevailing hydraulic pressure.

FIG. 3B illustrates the continuation of the method that is started in FIG. 3A. In the following method steps, a check is performed as to whether the determined hydraulic braking medium volume corresponds to the displacement of the brake piston by means of the electric brake motor, whether the hydraulic braking medium volume corresponds with the hydraulic reference volume within the scope of a permissible tolerance or deviates in an impermissible manner. If the two correspond, as established in the method step 42, a malfunction has not occurred and the braking force that is combined by means of adding the hydraulic and the electromechanical braking force corresponds to expectations. In step 43, this result is illustrated by way of an illuminating function light.

In accordance with step 44, the displaced hydraulic braking medium volume is greater than the reference volume which leads to an insufficient total braking force being established in step 45, said insufficient braking force being as a result by way of example of an air pocket in the braking system. In step 46, it is possible to illustrate this malfunction by means of generating an error signal by way of example as a blinking function light.

If the displaced hydraulic braking medium volume is smaller than the reference volume (step 47), a malfunction has likewise occurred, in which the total braking force is lower than a desired value which is established in step 48. This case can occur by way of example by means of kinked brake lines. An error signal is generated that is illustrated in step 49 as a blinking function light.

What is claimed is:

1. A method for operating a brake system that produces a braking force in a vehicle, comprising:
    generating the braking force with a brake piston by both (i) actuating a vehicle hydraulic brake having a braking force booster, the vehicle hydraulic brake having a prevailing hydraulic pressure acting on the brake piston, and (ii) actuating an electromechanical braking device having an electric brake motor that acts on the brake piston;
    determining a hydraulic reference volume from the prevailing hydraulic pressure based on a known pressure-volume correlation of the vehicle hydraulic brake;
    actuating the electric brake motor to move the brake piston and produce a corresponding hydraulic braking medium volume change in the vehicle hydraulic brake;
    comparing the hydraulic braking medium volume change with the hydraulic reference volume so as to evaluate the braking force; and
    generating an error signal in the event of an impermissibly high deviation between the hydraulic braking medium volume change and the hydraulic reference volume.

2. The method according to claim 1, further comprising:
    actuating the braking force booster to compensate for the hydraulic braking medium volume change in the vehicle hydraulic brake.

3. The method according to claim 2, wherein the actuation of the brake force booster compensates for the hydraulic braking medium volume change in such a way that hydraulic pressure in the vehicle hydraulic brake is maintained constant during the actuation of the electric brake motor.

4. The method according to claim 1, wherein the method is implemented when the vehicle is at a standstill.

5. The method according to claim 1, wherein the method is implemented only when the vehicle is travelling at a velocity below a threshold velocity.

6. The method according to claim 1, wherein the braking force booster comprises a second electric motor configured to boost the braking force, the method further comprising:
    actuating the second electric motor so as to generate the prevailing hydraulic pressure acting on the brake piston.

7. The method according to claim 1, further comprising:
    indicating an insufficient braking force when the hydraulic braking medium volume change is greater than the reference volume; and
    indicating the insufficient braking force when the hydraulic braking medium volume change is less than the reference volume.

8. The method according to claim 1, wherein generating an error signal further comprises displaying the error signal in one or more of an optical and acoustic manner.

9. The method according to claim 1, further comprising:
    actuating the electric brake motor further in a reapplication procedure to generate additional braking force when the error signal is generated.

10. The method according to claim 1, further comprising:
    actuating the braking force booster of the vehicle hydraulic brake in a reapplication procedure to generate additional braking force when the error signal is generated.

11. The method according to claim 1, wherein a hydraulic braking force is generated in the vehicle hydraulic brake and a mechanical braking force is generated simultaneously in the electromechanical braking device.

12. The method according to claim 11, wherein the prevailing hydraulic pressure in the vehicle hydraulic brake is maintained constant at least until the actuating of the electric brake motor to move the brake piston.

13. The method according to claim 11, wherein the vehicle hydraulic brake and the electromechanical braking device are separate from one another and act separately on the brake piston.

14. The method according to claim 1, further comprising:
    determining the hydraulic braking medium volume change by determining the distance traveled by the brake piston due to the actuation of the electric brake motor.

15. A regulating or controlling device for implementing a method for operating a brake system that produces a braking force in a vehicle, the regulating or controlling device configured to:
    generate the braking force with a brake piston by both (i) actuating a vehicle hydraulic brake having a braking force booster, the vehicle hydraulic brake having a prevailing hydraulic pressure acting on the brake piston, and (ii) actuating an electromechanical braking device having an electric brake motor that acts on the brake piston;
    determine a hydraulic reference volume from the prevailing hydraulic pressure based on a known pressure-volume correlation of the vehicle hydraulic brake;
    actuate the electric brake motor to move the brake piston and produce a corresponding hydraulic braking medium volume change in the vehicle hydraulic brake;
    compare the hydraulic braking medium volume change with the hydraulic reference volume so as to evaluate the braking force; and generate an error signal in the event of an impermissibly high deviation between the hydraulic braking medium volume change and the hydraulic reference volume.

16. A vehicle, comprising:

a braking system including (i) a vehicle hydraulic brake having a braking force booster and (ii) an electromechanical braking device having an electric brake motor; and a regulating or controlling device configured to control the braking system in the vehicle to:
- generate a braking force with a brake piston by both (i) actuating the vehicle hydraulic brake having the braking force booster, the vehicle hydraulic brake having a prevailing hydraulic pressure acting on the brake piston, and (ii) actuating the electromechanical braking device having the electric brake motor that acts on the brake piston;
- determine a hydraulic reference volume from the prevailing hydraulic pressure based on a known pressure-volume correlation of the vehicle hydraulic brake;
- actuate the electric brake motor to move the brake piston and produce a corresponding hydraulic braking medium volume change in the vehicle hydraulic brake;
- compare the hydraulic braking medium volume change with the hydraulic reference volume so as to evaluate the braking force; and
- generate an error signal in the event of an impermissibly high deviation between the hydraulic braking medium volume change and the hydraulic reference volume.

* * * * *